United States Patent [19]

Margraf

[11] 4,140,502
[45] Feb. 20, 1979

[54] FILTERING SEPARATORS WITH DUST FEEDBACK

[76] Inventor: Adolf Margraf, Am Schleplingsbach 46, 3060 Stadthagen Wendthagen, Fed. Rep. of Germany

[21] Appl. No.: 847,714

[22] Filed: Nov. 2, 1977

[30] Foreign Application Priority Data

Aug. 24, 1971 [DE] Fed. Rep. of Germany ....... 2738118

[51] Int. Cl.² ............................................. B01D 51/02
[52] U.S. Cl. ........................................ 55/267; 55/288; 55/312; 55/341 H; 261/81; 261/97
[58] Field of Search ................ 55/290, 296, 400, 300, 55/233, 312, 350, 302, 304, 341 H, 474, 283, 267, 288, 314, 341 R; 261/94–98, 81, 82, DIG. 72, 123, 21, 22

[56] References Cited

U.S. PATENT DOCUMENTS

| 497,034 | 5/1893 | Schmid | 55/400 X |
| 531,517 | 12/1894 | Draver | 55/296 X |
| 551,216 | 12/1895 | Livergood | 55/296 |
| 3,246,756 | 4/1966 | Binnix | 55/300 X |
| 3,739,551 | 6/1973 | Eckert | 55/233 X |
| 3,775,949 | 12/1973 | Wachter | 55/312 |
| 3,789,587 | 2/1974 | Moorefield | 55/290 |
| 3,868,237 | 2/1975 | Berz | 55/283 X |
| 3,913,890 | 10/1975 | Lankenau et al. | 261/DIG. 72 |

FOREIGN PATENT DOCUMENTS

588096 12/1959 Canada ...................................... 55/304

Primary Examiner—Richard L. Chiesa
Attorney, Agent, or Firm—Kinzer, Plyer, Dorn & McEachran

[57] ABSTRACT

This invention relates to filtering separators in particular pocket or tube filters, of the kind having a lower inlet for dirty, i.e. dust-or smoke-laden gas containing extremely adherent dust particles which is directed upwards towards the filter elements, the dust which settles when the filter surfaces are cleaned periodically being carried back to the filter surfaces by this dirty gas for agglomeration purposes and a proportion of the agglomerated dust which corresponds to the quantity of dust in the incoming dirty gas and which the said gas is not capable of carrying with it to the filter surface being extracted during the periodic cleaning of the filter elements.

8 Claims, 4 Drawing Figures

FIG. 1
FIG. 3
FIG. 2
FIG. 4
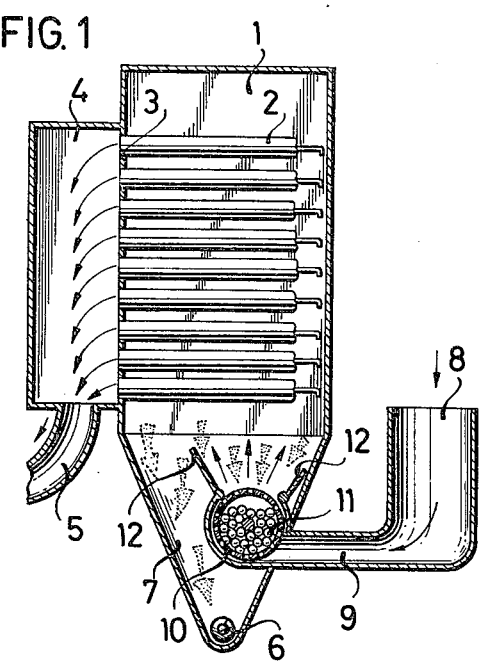
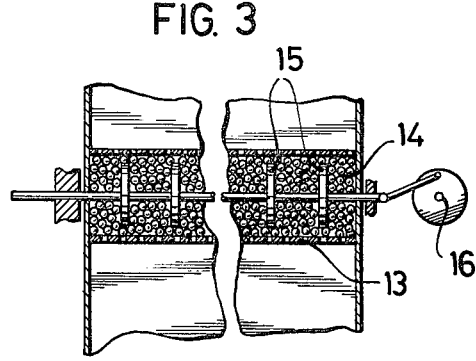
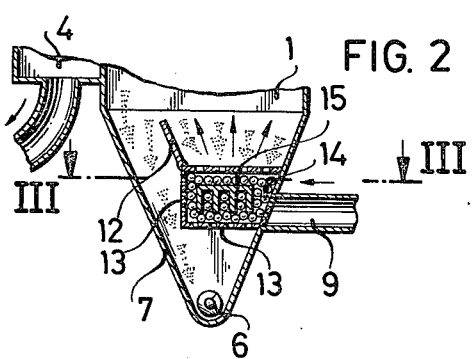
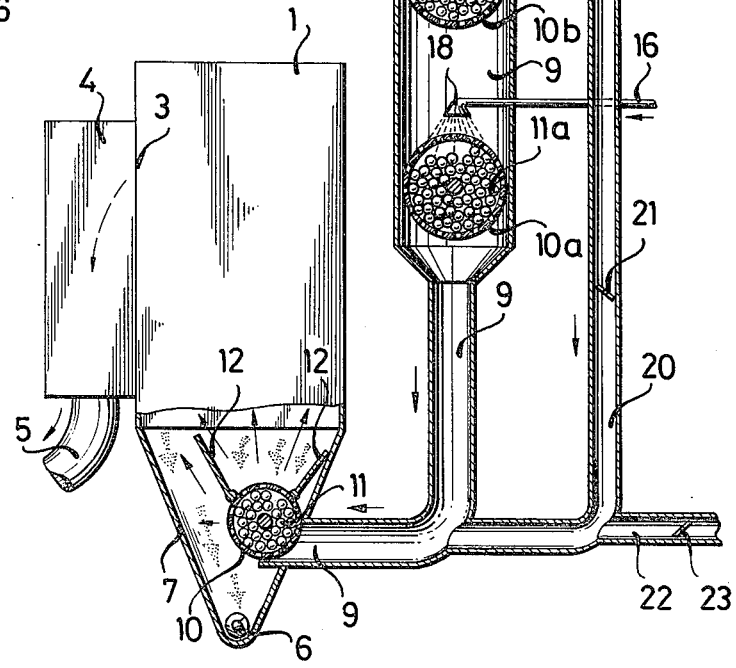

FILTERING SEPARATORS WITH DUST FEEDBACK

BACKGROUND OF THE INVENTION

According to the invention, a collector is arranged within a separator and underneath said filter elements, said container constituting a collecting zone, and occupying a portion of the downwardly projected area of said filter elements, the dirty gas being arranged to flow through said container, and said container being formed from a perforated wall and being filled with bodies around which the dirty gas flows. Force-applying means are provided in association with said container to detach the dust which clings to said bodies and collects between them, the said force-applying means being operative to make an at least intermittent application of force, and the coarse dust which enters the container zone when said filter elements are cleaned periodically is broken down until it is able to be carried back to the filter elements by the dirty gas.

The present invention relates to filtering separators in particular pocket or tube filters of the kind having a lower inlet for dust-or smoke-laden gas containing extremely adherent dust particles which is directed upwards towards the filter elements, the dust which settles when the filter elements are cleaned periodically being carried back to the filter elements by this dirty gas for agglomeration purposes and a proportion of the agglomerated dust which corresponds to the quantity of dust in the incoming dirty gas and which the said gas is not capable of carrying with it to the filter elements being extracted during the periodic cleaning of the filter elements. Hereinafter, such a separator will be referred to as "of the kind described".

By means of filtering separator of the kind described, it is possible to bring about agglomeration of the very fine dust contained in the smoke-laden gas while in the suspended state and immediately before it reaches the actual filter surfaces, so that in this way the layer of dust on the filter surfaces remains permeable to the smoke-laden gas, thus preventing the resistance of the filter to flow becoming excessive. In particular this makes it possible for the filter surfaces to be cleaned in the conventional fashion by countercurrent scavenging and/or joggling.

The method described above has proved satisfactory in practice as long as the adhesiveness of the very fine dust in the dirty i.e. smoke-laden gas which is due to its large surface area compared with its small mass, does not exceed a certain level. Due to the excessive adhesiveness of such fine dust in certain types of smoke-laden gas from smelting furnaces or the like, the particles of dust which build up on one another and on and in the filter surfaces remain clinging where they are or often remain suspended on the individual filaments of the filter surfaces in small clumps when conventional cleaning methods are used, despite the agglomeration by dust feedback, which may lead to irreversible obstruction of the filter and a continual reduction in the speed of filtering and a severe rise in the resistance to flow of the filter, which would mean that the filter system would have to be expanded to an economically unreasonable size.

It is an object of the invention to make it possible to use filtering separators such as pocket or tube filters in which the filter surfaces are cleaned periodically by countercurrent scavenging and/or joggling and in which the dust which settles during the periodic cleaning is fed back to the filter surfaces by the stream of smoke-laden gas, even when smoke-laden gases containing extremely adherent fine dust is to be cleaned and large amounts of dust remain in the filtering separator when this is done.

SUMMARY OF THE INVENTION

This and other objects are achieved in accordance with the invention which consists in a filter separator of the kind described wherein there is arranged within the separator, underneath the filter elements, a container to act as a collecting zone, which container occupies a part of the downwardly projected area of the filter elements, has the smoke-laden gas passing through it, is formed from preforated walls and is filled with bodies around which the gas flows, and in it the dust which clings to the bodies and collects between them is detached by the at least intermittent application of force, and the coarse dust which enters the container zone when the filter elements are cleaned periodically is broken down until it is able to be carried back to the filter elements by the smoke-laden gas.

In this way the tendency of dust particles of high adhesiveness to collect on and between bodies is exploited, the dust particles in this case, which collect on and cling to and between the bodies temporarily and which are at least partly agglomerated, losing all or part of their adhesiveness by a kind of ageing process. The collected dust particles which are then detached periodically from the bodies by the application of mechanical force travel to the filter elements in a pre-agglomerated and aged form in the smoke-laden gas and are periodically freed from the surfaces of the filter elements by a cleaning process and are fed back to the filter surfaces along with the smoke-laden gas and are further agglomerated. As a result of the transient collection of the dust particles and the feed-back of dust to the filter elements which takes place during the period when the filter elements are cleaned, the agglomerated dust particles reach a state which allows them to be satisfactorily detached from the filter surfaces in the conventional fashion by countercurrent scavenging and/or joggling.

Due to the nature of certain kinds of dust in smoke-laden gases it does happen that the agglomerated particles form very solid and heavy particles on the filter surfaces of the separator which the smoke-laden gas is incapable of carrying back with it to the filter surfaces which sink through the layer of smoke-laden gas and are extracted. Thus, it may occur that adequate quantities of dust to produce extensive agglomeration of the fine dust in the filter and on the filter surfaces are no longer retained in the filter. For this reason the body-filled container underneath the filter elements occupies a proportion of the downwardly projected area of the filter elements and catches a substantial proportion of these solid and heavy dust particles. These dust particles penetrate into the container through its perforated walls and are broken down again or ground as it were in it by the bodies when force is applied to them intermittently, and reach a state where the now ground dust particles can be fed back to the filter surfaces in the smoke-laden gas.

As soon as the filtering separator is operating under settled conditions, a portion of the dust which settles when the filter surfaces are cleaned periodically is guided to the body-filled container and the breaking down of the solid and heavy dust particles which may be required takes place in the container, while another portion of the solid and heavy dust particles settles around the container and is extracted, the total amount of dust which settles around the container corresponding to the amount of dust which is contained in the incoming smoke-laden gas.

At the beginning of operations, the filtering separator is fed with agglomeration nuclei in the form of dust, e.g. lime dust, which is advantageously fed to the body-filled container. After a certain time in which the amount of dust present in the separator is increased by the feedback of dust to a maximum depending on the velocity of the smoke-laden gas, a state of equilibrum or of settled operation is reached in which a proportion of the agglomerated dust which settles when the filter elements are periodically cleaned can no longer be carried back to the filter elements by the smoke-laden gas and is then extracted, this proportion of dust corresponding to the amount of dust which is contained in the incoming dust-laden gas.

BRIEF DESCRIPTION OF THE DRAWINGS

In order that the invention may be more clearly understood, reference will now be made to the accompanying drawings which show certain embodiments thereof by way of example and in which:

FIG. 1 is a schematic cross-section through a filtering separator having horizontal filter tubes, showing the configuration according to the invention of a collecting zone, FIG. 2 is a schematic cross-section through part of a modified form of collecting zone according to the invention, FIG. 3 is a partial sectional view on the line II—II of FIG. 2, and FIG. 4 is a schematic cross-section corresponding to FIG. 1 showing a plurality of dust collecting zones connected in series.

DETAILED DESCRIPTION OF PREFERRED EMBODIMENTS

Referring now to the drawings, in which lines parts bear like reference numerals, a tube filter is shown as an example of a filtering separator and in a housing 1 of this tube filter horizontal filter tubes 2 are secured to a perforated wall 3 with the open ends of the tubes, which open into a space 4 for clean gas, covering the perforations. The clean-gas space 4, in which a reciprocating nozzle for scavenging gas (not shown) periodically cleans the filter tubes 2 in countercurrent in a known fashion, is connected by a duct 5 to an extractor.

The dirty, i.e. smoke-laden gas is fed from a distribution passage 8 via connections 9 to a lower dust-collecting trough 7 which is provided with an extractor screw 6.

In accordance with the invention, the connection or connections 9 open into one or more containers which act as dust collecting zones and which are situated one behind the other. As shown in FIG. 1, the containers consist of a sieve-like or perforated drum 10 which can be rotated periodically and which has a filling of heavy bodies 11, e.g. spheres or other regular or irregular bodies made of steel, ceramics, stone or some other heavy material. The principal dimension of these bodies is advantageously between 5 and approximately 30 mm.

The collecting zone 10, 11 is not screened off at the top and the smoke-laden gas flows through it, when the extremely adherent dust particles contained in the gas deposit and collect on the bodies 11 and between them. In this way the dust at least partly ages and agglomerates in the collecting zone 10, 11 and thus loses all or part of its adhesiveness.

As soon as the resistance to flow through the collecting zone 10, 11 has reached a preset maximum value as a result of the dust which has accumulated in it, the drum 10 is caused to rotate for a time so that the agglomerated dust which has built up on and between the bodies 11 is detached by the rubbing of the bodies 11 as they cascade and is carried upwards to the filter elements 2 by the smoke-laden gas as it flows through. Then, as soon as the resistance to flow through the collecting area reaches a preset minimum value, the rotation of the drum 10 is stopped so that dust particles from the smoke-laden gas can again build up in it as they cling to the bodies 11 and accumulate between them.

It is advantageous for the starting and stopping of the drum to be performed automatically by a pressure-differential measuring device which measures the pressure upstream and down stream of the collecting zone 10, 11 and which operates a contact to start the drive when a preset maximum differential is reached a contact to stop it when a preset minimum differential is reached.

When dust feedback operation begins, at which time the dust in the filter is unagglomerated or only slightly agglomerated, agglomerated dust or extraneous dust, e.g. lime dust, is fed to the collecting zone 10, 11 or to the filtering separator, this dust forming agglomeration muclei for the very fine and extremely adherent dust in the smoke-laden gas.

The agglomerated dust which is freed from the bodies 10 by their rubbing movement, is fed to the filter elements 2 by the smoke-laden gas which carries it along in its upward travel. The filter elements 2 are cleaned periodically, e.g. by countercurrent scavenging and/or joggling, with the result that the freed dust attempts to settle but is caught hold of by the flow of smoke-laden gas and fed back to the filter elements. There is thus a steadily increasing further agglomeration of the dust with the pre-agglomerated dust from the collecting zone 10, 11, until the above mentioned state of equilibrium or settled operation is reached in which the smoke-laden gas is capable of carrying no further large agglomerated dust particles with it to the filter elements, with the result that when the filter elements are then cleaned a proportion of that agglomerated dust released from the filter surfaces which is large and heavy enough settles through the stream of smoke-laden gas around the collecting zone 10, 11 and can thus be extracted. This amount of dust is equal to the amount which is contained in the smoke-laden gas to be cleaned and the state concerned is established automatically.

The other part of the agglomerated dust which settles when the filter elements are clean sinks down towards the collecting zone 10, 11. If, as they do in many cases, the agglomerated dust particles of extreme adhesiveness have agglomerated on the surfaces of the filter elements into very solid and heavy particles, these particles make their way into the drum 10 against the flow of gas in the area of the collecting zone and are broken down again or ground by the periodic rotary movement and the rubbing of the bodies 11 which then occurs, so that they can then be picked up again by the smoke-laden gas and fed to the filter elements.

A proportion of the solid and heavy dust particles settles outside the area occupied by the collecting zone and is extracted. This latter proportion might cause a reduction in the desired amount of dust in the separator, which would reduce the agglomeration of the dust particles on the filter surfaces, and so that it remains as small as is required the area occupied by the collecting zone 10, 11 is increased by pivotable and lockable catchment surfaces 12 which are upwardly and outwardly directed. In this way the proportion of very heavy dust particles which sinks to the screw is reduced but an amount of dust which corresponds to the amount of dust in the smoke-laden gas to be cleaned is still removed.

It is also possible for the collecting zone 10, 11 to be replaced by trough-like containers 13 having perforated or sieve-like walls at the top and side as indicated in FIGS. 2 and 3. These containers 13 are filled with heavy bodies 14 which are periodically set in motion by an agitator to detach the accumulating or collected dust, the agitator to detach the accumulating or collected dust, the agitator consisting for example of circulating chains or of a rake 15 which is reciprocated by a crank drive 16 for example, so that in this case too it is possible to cause the bodies 14 to execute a rubbing movement and thus periodically to detach the dust which has accumulated on and between the bodies 14 by the application of external force, so that it can be carried along by the smoke-laden gas to the filter elements. The manner of operation is the same in this case as was described with reference to FIG. 1.

If a filtering separator 1 to 4 as described with reference to FIG. 1 is to be used to clean hot smoke-laden gases, the gas must be cooled to a temperature which can be tolerated by the material of the filter elements. For this purpose it has previously been the practice to position an evaporative cooler upstream of the separator 1. The procedure in accordance with the invention on the other hand is to position in the duct for the smoke-laden gas, upstream of the collecting zone 10, 11 or 13, 14, 15 shown in FIG. 1 or FIG. 2, at least one collecting zone, e.g. two further similar collecting zones in series, at least one of which has water fed to it via water pipes 16 and 17 and nozzles 18 and 19, the water being evaporated by the high temperature of the smoke-laden gas and the temperature of the gas thus being reduced to a level which can be tolerated by the material of the filter elements in the separator 1. Since in certain circumstances the temperature would be reduced to too great a degree, and in order to allow it to be controlled, a proportion of the hot gas which can be regulated by a flap 21 is fed through a bypass duct 20 and into the duct 9 for smoke-laden gas upstream of the collecting zone 10, 11 while bypassing one or both of the collecting zones 10a, 11a and 10b, 11b, and is mixed with the cooled smoke-laden gas so that the temperature of the gas in the filter separator is that required. External air may also be fed into the duct 9 for smoke-laden gas upstream of the collecting zone 10, 11 from a connection 22 containing a regulating flap 23.

The collecting zones 10a, 11a and 10b, 11b perform the same function, and are driven periodically in the same way, as the collecting zone 10, 11.

In certain cases it is also possible to connect a plurality of collecting zones 10, 11 into the duct 9 in parallel in order to split up very large quantities of smoke-laden gas and thus have a better control over the time for which the quantities of dust building up in the collecting zones remain there, since this promotes agglomeration and assists in reducing the adhesiveness of the dust particles.

I claim:

1. In a filtering separator of the kind having a lower inlet for dust-or smoke-laden gas containing extremely adherent dust particles which is directed upwards towards filter elements, the dust which settles when the filter surfaces are periodically cleaned being carried back to the filter surfaces by said smoke-laden gas for agglomeration purposes, and a proportion of the agglomerated dust which corresponds to the quantity of dust in the incoming dirty gas and which the said gas is not capable of carrying with it to the filter surface being extracted during the periodic cleaning of the filter elements, the improvement of a container arranged within the separator and underneath said filter elements, said container constituting a collecting zone, and occupying a portion of the downwardly projected area below said filter elements, the dirty gas being directed to flow through said container, and said having a perforated wall and being filled with bodies around which the dirty gas flows, force-applying means being provided in association with said container to vibrate said bodies and detach the dust which clings to said bodies and collects between them, the said force-applying means being operative to make an at least intermittent application of force, and the coarse dust which enters the collecting zone when said filter elements are periodically cleaned being broken down by the vibrating bodies until it is able to be carried back to the filter elements by the dirty gas.

2. A separator according to claim 1, and further comprising guiding means operative, when operation has settled down, to guide to said container a portion of the dust which settles when said filter elements are cleaned, while another portion which settles around the container is extracted, the size of this latter portion corresponding to the amount of dust which is contained in the incoming dirty gas.

3. A separator according to claim 1, wherein said container has associated with it upwardly and outwardly inclined catchment surfaces.

4. A separator according to claim 3, wherein said catchment surfaces are pivotable and lockable.

5. A separator according to claim 1, and further comprising at least one further container arranged in said duct for the dirty gas, upstream of said first mentioned container, said at least one further container through which gas flow may take place, being filled with bodies which are movable by the periodic application of force, said at least one further container having water fed to it for evaporation cooling and being bridged by an adjustable duct bypassing said first-mentioned duct for the dirty gas.

6. A separator according to claim 1, wherein said container which acts as the collecting zone consists of a periodically rotatable perforated drum containing heavy bodies.

7. A separator according to claim 1, wherein said container which acts as the collecting zone consists of an elongated trough having perforated walls and containing heavy bodies of regular and irregular shape which are periodically set in motion by an agitator.

8. A separator according to claim 1, including a pressure-differential measuring device to start and stop the application of force to said bodies, said pressure-differential measuring device being responsive to a preset maximum resistance to flow and to a preset minimum resistance to flow and also being operative to switch electrical contacts.

* * * * *